July 27, 1937. O. HAUCKE 2,087,909
VEHICLE WHEEL AND CHASSIS ALIGNMENT DEVICE
Filed Feb. 17, 1937 2 Sheets-Sheet 1

INVENTOR.
Oswin Haucke
BY
ATTORNEY.

July 27, 1937.　　　　O. HAUCKE　　　　2,087,909
VEHICLE WHEEL AND CHASSIS ALIGNMENT DEVICE
Filed Feb. 17, 1937　　　　2 Sheets-Sheet 2

INVENTOR.
Oswin Haucke
BY
ATTORNEY.

Patented July 27, 1937

2,087,909

UNITED STATES PATENT OFFICE 2,087,909

VEHICLE WHEEL AND CHASSIS ALIGNMENT DEVICE

Oswin Haucke, Brooklyn, N. Y.

Application February 17, 1937, Serial No. 126,108

4 Claims. (Cl. 33—203)

The invention relates to alignment devices, such as are used for the alignment of the wheels and chassis of vehicles, particularly of the automotive type. It has for one of its main objects to provide a device by means of which all the various alignments of the wheels, chassis and axles of a vehicle may be checked. Another object is to provide a device by means of which the steering gear mechanism of a vehicle may be tested as to its various angular adjustments, as well as for inaccuracies in adjustment or alignment of the various parts of the steering gear mechanism.

A further object is to provide means by which the amount of such inaccuracies will be readily indicated. A still further object is to so construct the device that it may be used with automobiles of various sizes and makes. Additional objects are to provide a device of simple and rugged construction, which requires no particular skill to operate, which will occupy but small space, which will effect a great saving in both time and labor, and which can be manufactured and installed at a comparatively low cost.

Figure 1:
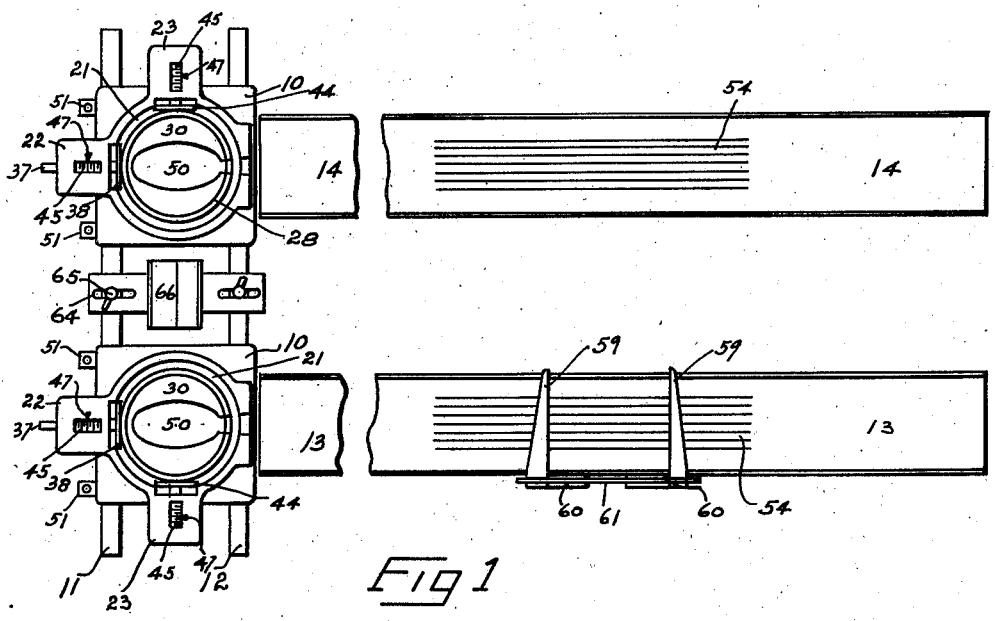
Figure 2:
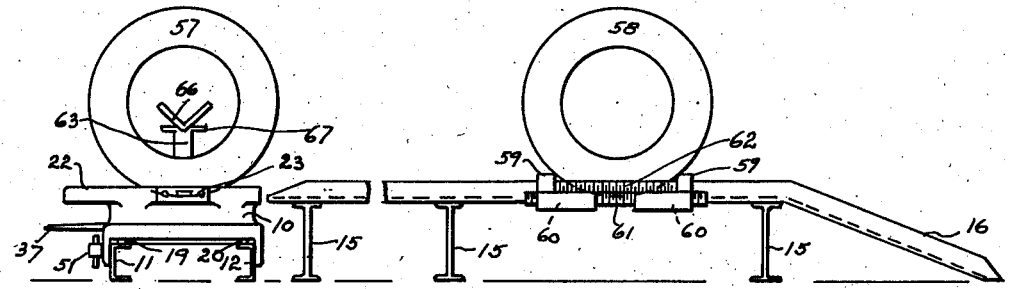
Figure 3:
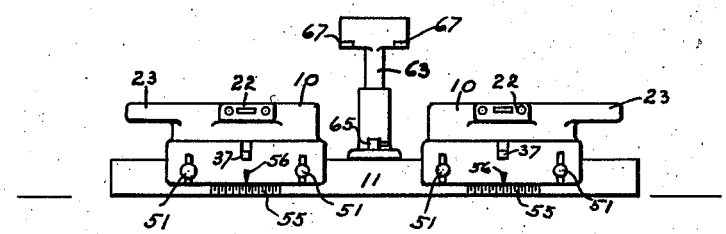
Figures 4, 6:
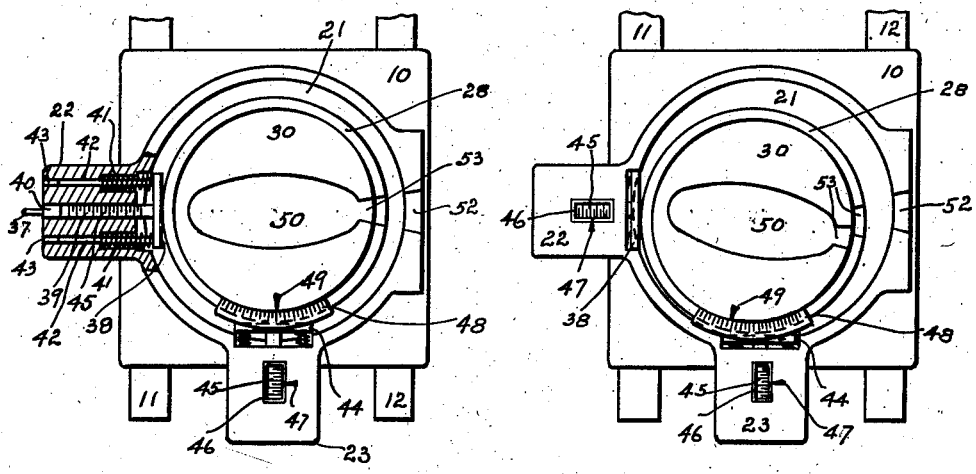
Figures 5, 7:
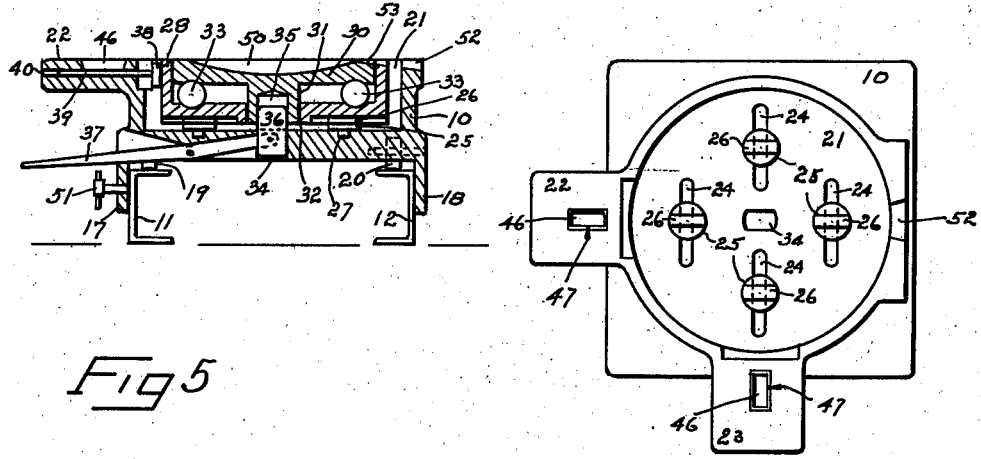
Figure 8:
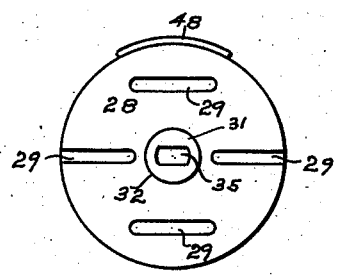

These and various other objects and advantages will be readily understood from the following description and from the accompanying drawings of a preferred embodiment of the invention, in which, however, various modifications may be made without departing from the scope of the appended claims. In the drawings Fig. 1 is a plan view of the device;

Fig. 2 a side elevation;

Fig. 3 a front view;

Fig. 4 a plan view of one of the wheel carriages, shown partly in cross-section;

Fig. 5 a cross-sectional, side elevation of Fig. 4;

Fig. 6 another plan view similar to Fig. 4, but showing the parts in different positions;

Fig. 7 a plan view of the carriage with certain parts removed;

Fig. 8 a bottom view of one of the parts employed in the carriage; and

Figures 9, 10:
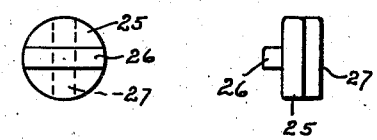

Figs. 9 and 10 show, respectively, a top view and a side view of another part used in the carriage.

Referring first to Figs. 1, 2 and 3, the device consists of two carriages 10 which are slidingly mounted on two channel rails 11 and 12, and of a pair of runways 13 and 14, with which the carriages can be aligned. The runways are supported on a plurality of beams 15. The rear ends 16 of the runways are inclined so that a car may readily be driven on to them.

The construction of one of the carriages is plainly shown in Figs. 1 to 10 inclusive. It consists of the carriage proper 10, which in this case has been shown of rectangular shape and with two downwardly-extending flanges 17 and 18, which straddle the rails 11 and 12. The carriage is mounted on these rails by a plurality of small wheels 19 and 20. It is also provided with a circular recess 21 and with two radial projections 22 and 23. As shown in Fig. 7, a plurality of key-ways 24 are milled in the bottom of the recess 21 and in these, key disks 25 are slidingly mounted. One of these key disks is shown in detail in Figs. 9 and 10. Each of them consists of the disk proper which is provided with keys 26 and 27 at opposite sides of the disk, and the keys are located substantially at right angles to each other.

A cup-shaped member 28, the bottom face of which is plainly shown in Fig. 8, is likewise provided with a plurality of key-ways 29 which are milled in the bottom face. The keys 26 of the key disk 25 fit slidingly in these key-ways. As the recess 21 is of larger size than the cup-shaped member 28, it is evident that this member may move in any direction in the recess due to the action of the key disks. A turn table 30 is mounted inside of the cup-shaped member and has a boss 31 which extends into an opening 32 formed in the bottom of the cup-shaped member. A plurality of balls 33 are interposed between the bottom of the recess in the member 28 and the turn table 30 so as to facilitate its rotation.

A substantial rectangular opening 34 is formed in the bottom of the carriage and aligns with a similarly shaped socket 35 formed in the boss 31. A plunger 36 is slidingly mounted in the opening 34 and actuated by means of a lever 37. When the plunger 36 is in the position shown in Fig. 5, the cup-shaped member, as well as the turn table 30, is locked in relation to the carriage so that these parts can not move in relation to the carriage or to each other.

A pressure shoe 38, having a rearwardly extending bar 39 slidingly mounted in a rectangular slot 40, is mounted in the carriage in such a manner that the pressure shoe extends into the recess 21. The rectangular slot 40 is formed in the projection 22, as plainly illustrated in Fig. 4. The pressure shoe is always held in engagement with the cup-shaped member 28 by means of two compression springs 41, mounted on rods 42. These rods are slidingly mounted in openings 43 drilled in the projection 22. A similar pressure shoe 44 is slidingly mounted in the boss 23 and is in all particulars like the sliding shoe just described.

The bars 39 are graduated, as for example in inches and fraction of inches, as shown at 45 and openings 46 are formed in the top faces of the projections through which the graduations on the bars may be viewed. Pointers 47 are secured on top of the projections, as shown. An arcuated and graduated scale 48 is rigidly secured on the top edge of the cup-shaped member 21, while a pointer 49 is secured on the turn table 30. A depression 50 is formed centrally in the turn table. This depression is of such a size and shape so as to center the tire of a wheel when the wheel is driven on to the turn table.

As previously said the carriages are mounted on the rails 11 and may be clamped to these rails by means of clamping screws 51. To check the alignment of the wheels and the chassis of an automobile, the automobile is driven on the runways and the carriages aligned with the front wheels of the automobile. When thus aligned, the wheels are run into the depressions 50, being guided by grooves 52 and 53 formed, respectively, in the upper faces of the carriage and in the cup-shaped member. While the automobile is driven on to the carriages the plungers 36 are engaged in the socket 35 so that the various parts of the carriage cannot move or rotate in relation to each other.

With the front wheels in this position, the wheels may readily be checked by means of the scale lines 54 imprinted on the runways and by the scale lines 55 imprinted on the front of the channel beam 11. Pointers 56 located on the front of each carriage facilitate the readings of the scale 55.

To ascertain the parallelism of the front and rear axles, the device shown in Figs. 1 and 2 is employed. The automobile is driven up on the device so that the front wheels 57 rest in the depressions in the carriages and the rear wheels 58 on the runways. The device consists of a pair of separate arms 59, on the front end of which a channel 60 is formed by extending the metal downwardly and sidewardly. This extension is adapted to slide along the outside of the runways so as to hold the arms at right angles to the runways. A steel scale 61 is placed slidingly in the channel 60 and scale lines 62 are imprinted on the side of the runways.

It will be seen that, when the front wheels are located in the carriages and the arms 59 are moved along the runways until they contact with the tire of the wheel, by centralizing the scale 61 between the arms, the distance between the front wheels and the rear wheels may be easily ascertained.

I have found in practice that to obtain all the various measurements with the greatest degree of accuracy, the automobile should preferably be secured to the device in such a manner that the chassis cannot move in relation thereto. This is particularly true when checking up the steering wheel mechanism. For this reason I mount a jack 63 transversely on the rails 11 and 12. This jack is slidingly mounted on the rails by means of slots 64 and clamps 65 so that it may be placed directly under the front axle. When so located the jack is raised until it abuts the axle, but does not lift it, after which the axle is clamped in the V-shaped trough 66 by means of ordinary C clamps passed over the axle and lugs 67 provided on the jack.

While I have shown and prefer to employ a pair of runways, such as shown at 13 and 14, it is evident that the rails 11 and 12, together with the carriages mounted thereon, might be mounted in a pit in the floor so that the runways might be dispensed with. In like manner, while I prefer to secure the chassis of the automobile being tested by means of a jack, such as shown in 63, other means for securing the chassis might be employed.

Having described the invention and its objects, what I claim as new and wish to protect by Letters Patent is:—

1. An alignment device of the class described comprising, a pair of rails; a pair of carriages slidingly mounted on said rails; a circular recess formed in each of said carriages; a cupped disk, of smaller diameter than the recess in the carriage, inserted in said recess and free to move therein in any horizontal direction; a turn table rotatingly mounted in said cupped disk; wheel centering means provided in the top face of said turn tables; and means associated with the carriages for ascertaining the movements of the cupped disks.

2. An alignment device of the class described comprising, a pair of rails; a pair of carriages slidingly mounted on said rails; a circular recess formed in each of said carriages; a cupped disk, of smaller diameter than the recess in the carriage, inserted in said recess and free to move therein in any horizontal direction; a turn table rotatingly mounted in said cupped disk; wheel centering means provided in the top face of said turn tables; means associated with the carriages for ascertaining the movements of the cupped disks; and means associated with the turn table and the cupped disks for ascertaining the amount of rotation of the turn tables.

3. An alignment device of the class described comprising, a pair of rails; a pair of carriages slidingly mounted on said rails; a circular recess formed in each of said carriages; a cupped disk, of smaller diameter than the recess in the carriage, inserted in said recess and free to move therein in any horizontal direction; a turn table rotatingly mounted in said cupped disk; wheel centering means provided in the top face of said turn tables; means associated with the carriages for ascertaining the movements of the cupped disks; means associated with the turn tables and the cupped disks for ascertaining the amount of rotation of the turn tables; and means for locking the carriages to the rails.

4. An alignment device of the class described comprising, a pair of rails; a pair of carriages slidingly mounted on said rails; a circular recess formed in each of said carriages; a cupped disk, of smaller diameter than the recess in the carriage, inserted in said recess and free to move therein in any horizontal direction; a turn table rotatingly mounted in said cupped disk; wheel centering means provided in the top face of said turn tables; means associated with the carriages for ascertaining the movements of the cupped disks; means associated with the turn tables and the cupped disks for ascertaining the amount of rotation of the turn tables; means for locking the carriages to the rails; and means for locking disks and the turn tables to the carriages in their inoperative positions.

OSWIN HAUCKE.